Feb. 28, 1950  C. B. DOTY  2,498,851
WEATHER STRIP FOR VEHICLE DOORS
Filed June 8, 1946
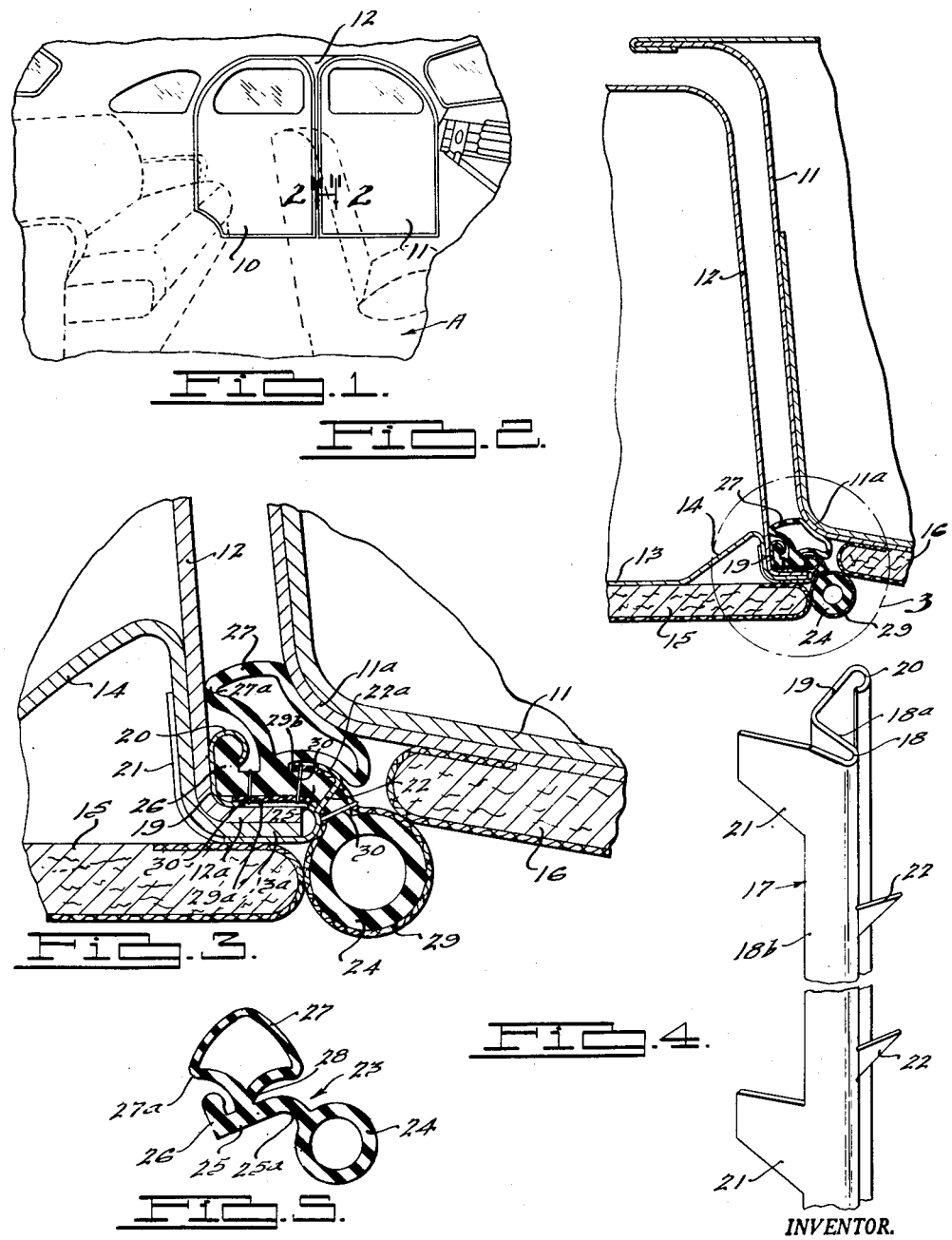
INVENTOR.
Clifford B. Doty.
BY
Elmer Jamison Gray
ATTORNEY.

Patented Feb. 28, 1950

2,498,851

UNITED STATES PATENT OFFICE 2,498,851

WEATHER STRIP FOR VEHICLE DOORS

Clifford B. Doty, Detroit, Mich., assignor to Briggs Manufacturing Company, Detroit, Mich., a corporation of Michigan Application June 8, 1946, Serial No. 675,401

16 Claims. (Cl. 296—44)

This invention relates to weatherstripping for motor vehicle bodies, an object of the invention being to provide an improved and simplified weatherstripping for sealing the spaces or joints between the doors and the adjacent portions of the vehicle body around the door openings.

A further object of the invention is to provide an elastic or yieldable weatherstrip for effecting a seal around a door opening, when the door is closed, such weatherstrip being easy to install and having the advantage of providing substantially uniform contact with the door and door frame along spaced parallel lines whereby a single means, relatively easy and cheap to manufacture, is capable of providing an adequate and efficient seal.

Still a further object of the invention is to provide a weatherstrip combining in a single flexible piece an outer door seal and an inner windlace adapted to be carried by a metal retainer constructed in improved manner so as to be readily attached to the inner flanged edge of the body frame.

Another object of the invention is to provide an improved elastic or yieldable weatherstrip means for a door capable of providing sealing engagement with the door over a substantial area while also being of such construction as to accommodate variations in the clearance between the door and frame consequent to tolerance variations in production.

Still another object of the invention is to provide retainer means for supporting an elastic or yieldable weatherstrip which may be inexpensively manufactured and quickly and easily installed on the door.

A further object of the invention is to provide an improved unitary retainer means for supporting a flexible weatherstrip and a windlace which will efficiently seal at two points or regions when installed.

A further object of the invention is to provide improved weatherstrip means comprising as a unit a metallic retainer strip and an elastic or yieldable weatherstrip carried thereby, which unit may be quickly installed on the vehicle door by means of deformable metallic elements carried by the retainer strip at spaced points in its length and adapted to be bent or clinched into position along an edge of the door.

Other objects of this invention will appear in the following description and appended claims, reference being had to the accompanying drawings forming a part of this specification wherein like reference characters designate corresponding parts in the several views.

Fig. 1 is a fragmentary perspective view of the interior of a motor vehicle body equipped with weatherstripping constructed in accordance with the present invention.

Fig. 2 is an enlarged horizontal sectional view taken substantially through lines 2—2 of Fig. 1 looking in the direction of the arrows.

Fig. 3 is an enlarged fragmentary sectional view illustrating that portion of the structure of Fig. 2 contained within the circle numbered 3.

Fig. 4 is a fragmentary perspective view of the metallic retainer strip.

Fig. 5 is a sectional view of the combined weatherstrip and windlace adapted to be supported by the metallic retainer strip shown in Fig. 4.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings I have illustrated, by way of example, one embodiment of the present invention as applied to an automobile body indicated at A in Fig. 1. The body is of any conventional construction having lefthand rear and front doors 10 and 11, respectively, and a center body pillar 12. This pillar is of channel construction having opposed jamb faces each terminating adjacent the inner marginal edge thereof in an outturned flange 12a, this flange extending outwardly of the jamb face into the door opening. The open side of the pillar 12 is closed or boxed in by a metal closure or facing plate 13 having outturned flanges, one such flange 13a being illustrated in Figs. 2 and 3 and extending contiguous to the flange 12a. The flanges 12a and 13a may be secured together in any suitable manner, such as by spot welding, and these flanges together form an edge member extending transversely of and outwardly of the jamb face of the door frame or pillar into the door opening and terminating in an edge spaced outwardly of the jamb face.

The metal plate or strip 13, which closes the inner side of the pillar 12, is embossed to provide a number of outwardly extending depressions, pockets or recesses 14 along each vertical inner side edge of the pillar immediately behind each of the flange or edge members 12a, 13a. The recesses or openings 14 are spaced apart predetermined distances and are preferably formed by a simple press operation, although it will be understood that these openings may be punched out or pierced in the metal of the face plate 13. The metal plate or strip 13, in the finished body, is concealed by the usual trim panel 15 secured thereto in any conventional manner. Likewise the inner faces of the rear and front doors are finished by means of trim panels 16.

In the present embodiment of the invention the weatherstrip as a whole comprises a metal retainer strip adapted to be secured along the edge of the door frame and a yieldable or elastic sealing strip carried by the retainer strip and disposed in such manner as to be engaged by the inner edge of the door in the closed position of the latter. In the preferred embodiment of the invention the sealing strip is formed integrally with a windlace which is disposed interiorly of the body and designed to close the gap between the trim panel 16 and the edge member 12a, 13a.

Referring particularly to Fig. 4, the retainer strip, indicated as a whole at 17, comprises a strip of metal which is rolled or otherwise formed to provide a channel or groove 18 adapted to fit over the flange portion or edge member 12a, 13a. When so positioned the outer wall 18a of the channel 18 extends along the outer face of the edge flange 12a, as shown in Fig. 3. The metal retainer strip is also rolled or pressed to provide a channel which is general is formed oppositely to the channel 18 and comprises a wall 19 extending outwardly from the inner edge of the wall 18a and terminating in a partially coiled edge portion 20. When the retainer strip is installed on the edge member 12a, 13a the wall 19 extends along the jamb face of the pillar 12, as shown in Fig. 3, and the channel formed by this wall and the coiled edge 20 is disposed within the angle formed by the edge member 12a, 13a and the jamb face of the pillar, this channel opening outwardly to provide a retainer means for the elastic sealing strip.

The channel 18 is also provided with an inner wall 18b extending generally parallel to the wall 18a. The wall 18b is generally in the form of a return bent flange which is cut away or stamped to provide a series of spaced tabs or projecting tongues 21. These tabs are spaced apart throughout the length of the retainer strip 17 in accordance with the spacing of the recesses or openings 14 and, of course, correspond in number thereto. In addition to the projecting tongues or tabs 21 the outer portion of the channel 18 is provided with integral pointed ears or claws 22 which are struck out from the metal of the channel and project outwardly thereof into the door opening. These claws or prongs 22 serve the purpose, as hereinafter described, of attaching the weatherstrip to the retainer strip 17. In the preferred construction the retainer strip is of sufficient length and shape to extend entirely around three sides of the door opening, namely, along the top, front and rear edges thereof. However, it will be understood that a plurality of these retainer strips extending from end to end may be utilized.

Referring particularly to Fig. 5, the resilient or elastic sealing strip forming part of the weatherstrip as a whole is illustrated at 23. This sealing strip is preferably extruded in one piece from natural or synthetic rubber or equivalent flexible or elastic material. In the construction illustrated in the present embodiment of the invention the sealing strip comprises a round tubular windlace 24 joined integrally to a flat base section 25 by means of a curved neck portion 25a shaped to receive the outer edge of the channel 18. The base section 25 terminates in an outwardly extending rib 26 which may be widened along its outer edge to provide a rounded bead fitting into the coiled portion 20 of the retainer strip. Formed integrally with the base section 25 and extending outwardly thereof is a sealing member 27 which in the present instance is generally triangular and also hollow so as to be readily collapsible or deformable when engaged by the edge of the door. The hollow generally triangular sealing member 27 has curved converging base portions which merge into a readily bendable flange or wall portion 28 joined to the outer face of the base section 25 intermediate the edges thereof.

The sealing strip 23 is assembled with the retainer strip 17 by inserting the rib 26 within the outwardly facing channel formed by the wall 19 and coiled portion 20. The latter may be crimped or pressed after installation of the rib 26 in order to clinch the rib in position against any danger of removal. It will be noted that the base section 25 of the sealing strip extends smoothly along the face of the wall 18a of the retainer strip while the neck portion 25a partially embraces and extends around the curved outer edge of the channel 18. The windlace 24 and a portion of the base 25 may be covered by means of a trim fabric 29, as illustrated particularly in Fig. 3. This fabric extends entirely around the windlace and also along opposite faces of the base section 25 and neck portion 25a as shown at 29a and 29b in Fig. 3. The fabric 29 may be cemented to the windlace 24 or may be firmly secured in position by spaced stitching 30 passing through the cloth and the base 25 at opposite sides of the flange 28 and also passing through the neck portion 25a of the sealing strip. With the cloth or trim fabric 29 assembled on the sealing strip the latter is then assembled with the retainer strip 17. During this operation the prongs or claws 22 are forced through the cloth covered neck portion 25a and then clinched over at 22a. When thus assembled, as illustrated in Fig. 3, it will be seen that the sealing strip is permanently held in position by means of the rib 26 lying within the channel 19, 20 and the prongs or claws 22 on which the neck portion 25a is impaled.

An important feature of the invention resides not only in the construction of the weatherstrip but also in the manner in which it is installed on the body and, in addition, in the manner in which sealing contact with the door is provided over a relatively large area thereof. With the fabric covered sealing strip 23 firmly anchored within the channel 19, 20 and secured in position by means of the prongs or claws 22, the retainer strip is installed on the body by inserting the channel 18 over the edge member 12a, 13a. When thus installed the tabs 21 will be disposed opposite the pockets or recesses 14 which are located at the proper spaced intervals around the edges of the door opening.

After sliding the channel 18 over the edge member 12a, 13a and with the tabs 21 lined up or in registry with the pockets 14, the tabs are hammered or otherwise bent tightly into these pockets as illustrated in Figs. 2 and 3. This firmly anchors the weatherstrip to the body, since the tabs are hooked or bent tightly around the corners or edges of the pockets so as to extend across the plane of the inner terminus of the edge member 12a, 13a.

It will be noted that the inner edge of the door jamb is formed with a smooth curved surface 11a. When the door is closed this curved corner 11a of the door engages one angular side wall of the sealing member 27, thereby partially collapsing or flattening this member in a manner similar to that illustrated in Figs. 2 and 3. As a result of this construction a uniform contact between the sealing member 27 and the curved edge 11a of the door is ensured over a relatively large area of the door, thus increasing materially the sealing effectiveness of the weatherstrip. The size of the sealing member 27 is preferably such that when the member is partially collapsed by engagement of the door therewith one edge 27a of the sealing member 27 will smoothly engage the jamb face of the pillar 12 along a line spaced outwardly of the channel 19, 20 of the retainer strip. The arrangement of the windlace member 24 is such that the edge of the trim panel 16 will engage the same when the door is closed thereby providing an additional sealing means.

I claim:

1. In a vehicle body having a door frame provided with a jamb face and an edge member adjacent the inner marginal edge of the jamb face extending outwardly of the latter into the door opening, a metal piece having a channel embracing said edge member and a projecting portion positioned at said jamb face, a resilient weatherstrip comprising a portion secured to said projecting portion adjacent said channel and within the angle between said jamb face and edge member, a second portion integral therewith and extending into the door opening for engagement by the door, and a third portion integral with said first and second named portions extending into position to form a windlace.

2. In a vehicle body having a door frame provided with a jamb face and an edge member adjacent the inner marginal edge of the jamb face extending outwardly of the latter into the door opening, a metal piece having a channel embracing said edge member and a projecting portion positioned at said jamb face, and a one-piece resilient weatherstrip having one edge secured to said projecting portion adjacent said channel and within the angle between said jamb face and edge member, the opposite edge formed to provide a windlace and a portion intermediate said edges extending into the door opening for engagement by the door when closed.

3. In a vehicle body having a door frame provided with a jamb face and an edge member adjacent the inner marginal edge of the jamb face extending outwardly of the latter into the door opening, a metal piece having a channel embracing said edge member and a projecting portion positioned at said jamb face, and a one-piece resilient weatherstrip having a base portion anchored to said projecting portion adjacent the outer side of said channel and within the angle between said jamb face and edge member, a sealing member integral with said base portion and engageable by the door, and a windlace integral with said base portion.

4. In a vehicle body having a door frame provided with a jamb face and an edge member adjacent the inner marginal edge of the jamb face extending outwardly of the latter into the door opening, a metal piece having a channel embracing said edge member and a projecting portion positioned at said jamb face, a resilient weatherstrip comprising a base portion anchored to said projecting portion within the angle between said jamb face and edge member, a door engaging sealing member integral with said base portion and a tubular windlace formed integrally with the inner edge of said base portion.

5. In a vehicle body having a door frame provided with a jamb face and an edge member adjacent the inner marginal edge of the jamb face extending outwardly of the latter into the door opening, a metal piece having a channel embracing said edge member, a resilient weatherstrip comprising spaced integral portions forming a sealing member and a windlace, means for securing the weatherstrip to said metal piece, and a projecting portion on said piece bendable transversely of said edge member into an opening in the frame for securing the strip thereto.

6. In a vehicle body having a door frame provided with a jamb face and an edge member adjacent the inner marginal edge of the jamb face extending outwardly of the latter into the door opening, a metal piece having a channel embracing said edge member, a resilient weatherstrip comprising spaced integral tubular portions forming a sealing member and a windlace, means on said metal piece adapted to be clinched over said weatherstrip, and a projecting portion on said piece bendable transversely of said edge member into an opening in the frame for securing the strip thereto.

7. In a vehicle body, a door frame having a jamb face provided adjacent its inner marginal edge with a flange extending outwardly of the jamb face into the door opening, a metal piece having adjacent reversely formed channels one opening toward the frame to embrace said flange and the other opening away from the frame, a yieldable weatherstrip anchored in said last mentioned channel and including spaced integral door engaging sealing and windlace members, and means for securing said piece to the frame, said means comprising a projecting portion on said piece bendable transversely of the plane of said flange across the inner edge thereof into a recess in the frame.

8. In a vehicle body, a door frame having a jamb face provided adjacent its inner marginal edge with an edge member extending outwardly of the jamb face into the door opening, a retainer member having generally oppositely opening channels, one channel fitting over said edge member, a flexible sealing strip having an edge anchored within the other channel, and spaced projections extending from the edge of the outer wall of said one channel and bendable transversely across the plane of said edge member into openings in the frame, said sealing strip including a portion clinched to the outer face of said one channel by projections on the latter extending through said portion.

9. In a vehicle body, a door frame having a jamb face provided adjacent its inner marginal edge with an edge member extending outwardly of the jamb face into the door opening and terminating in an edge spaced outwardly of said jamb face, a metal piece having adjacent channels one opening toward the frame to embrace said edge member and the other disposed adjacent said jamb face and extending into the angle between said edge member and jamb face, a yieldable weatherstrip anchored in said last mentioned channel, and means for securing said piece to the frame, said weatherstrip comprising spaced integrally formed door engaging sealing and windlace portions.

10. In a vehicle body, a door frame having a jamb face provided adjacent its inner marginal edge with an edge member extending outwardly of the jamb face into the door opening and terminating in an edge spaced outwardly of said jamb face, a metal piece having an inwardly opening channel embracing said edge member, and a resilient weatherstrip having a portion secured to said piece adjacent said channel at the outer face of said edge member and extending into the door opening for engagement by the door when closed, the inner side of said channel having a projecting portion bendable across the plane of said edge member into a recess in the frame, said weatherstrip also having an integral portion disposed in position to provide a windlace.

11. In a vehicle body, an upright door frame having a jamb face provided adjacent its inner marginal edge with an edge member extending outwardly of the jamb face into the door opening and terminating in an edge spaced outwardly of said jamb face, a metal piece having adjacent reversely formed channels one opening toward the frame to embrace said edge member and the other opening away from the frame and lying in the space between said jamb face and edge member at the outer face of the latter, a yieldable weatherstrip anchord in said last mentioned channel, a windlace integral with said weatherstrip, and bendable projections on said metal piece for securing it to the frame.

12. In a vehicle body, an upright door frame having a jamb face provided adjacent its inner marginal edge with an edge member extending outwardly of the jamb face into the door opening and terminating in an edge spaced outwardly of said jamb face, a metal piece having adjacent reversely formed channels one opening toward the frame to embrace said edge member and the other opening away from the frame and lying in the space between said jamb face and edge member at the outer face of the latter, a yieldable weatherstrip anchored in said last mentioned channel, means for securing a windlace to said piece, and means for securing said piece to the frame.

13. In a vehicle body, a door frame having a jamb face provided adjacent its inner marginal edge with an edge member extending in a plane longitudinally of the body and outwardly of the jamb face into the door opening, a metal piece having an inwardly opening channel embracing said edge member, means for securing a windlace to said piece, and a resilient weatherstrip having an edge portion secured to said piece adjacent said channel at the outer face of said edge member and extending into the door opening for engagement by the door when closed, the inner side of said channel having a projecting portion bendable transversely across the plane of said edge member into a recess in the frame.

14. A weatherstrip comprising a retainer strip having longitudinal channels opening generally oppositely to each other, one channel adapted to fit over an edge member on the inner jamb edge of a door frame, a flexible sealing strip having an edge secured within the other channel, spaced projections extending from the edge of the outer wall of the first channel in the plane thereof and bendable transversely for securing the retainer strip to the frame, and additional means on said strip for attaching a windlace thereto.

15. A weatherstrip comprising a retainer strip having longitudinal channels opening generally oppositely to each other, one channel adapted to fit over an edge member on the inner jamb edge of a door frame, a flexible sealing strip having an edge secured within the other channel, and spaced angularly related projections extending from the outer wall of the first channel for securing the retainer strip to the frame and also for securing a windlace to the strip.

16. In a vehicle body, a door frame having a jamb face provided adjacent its inner marginal edge with an edge member extending outwardly of the jamb face into the door opening, a retainer member having reversely opening channels, one channel fitting over said edge member, a flexible sealing strip having an edge anchored within the other channel, and projections extending from the outer wall of said one channel, certain of said projections being bendable across the plane of said edge member into retaining positions with respect to the door frame and other projections being pointed to permit impalement thereon of a windlace.

CLIFFORD B. DOTY.

REFERENCES CITED

The following references are of record in the file of this patent:

UNITED STATES PATENTS

| Number | Name | Date |
| --- | --- | --- |
| 1,613,044 | Marshall | Jan. 4, 1927 |
| 2,165,399 | McCormick | July 11, 1939 |
| 2,263,806 | Hammerl | Nov. 25, 1941 |
| 2,294,101 | Tripp | Aug. 25, 1942 |
| 2,365,231 | Wegman | Dec. 19, 1944 |